United States Patent
Biskeborn

(10) Patent No.: US 10,199,060 B2
(45) Date of Patent: Feb. 5, 2019

(54) MAGNETIC RECORDING HEAD HAVING LONGITUDINALLY SPACED OFFSET ARRAYS

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/973,381

(22) Filed: May 7, 2018

(65) Prior Publication Data

US 2018/0254060 A1    Sep. 6, 2018

Related U.S. Application Data

(63) Continuation of application No. 15/194,274, filed on Jun. 27, 2016, now Pat. No. 10,032,471.

(51) Int. Cl.
  G11B 5/53    (2006.01)
  G11B 5/48    (2006.01)

(52) U.S. Cl.
  CPC ............ *G11B 5/4893* (2013.01); *G11B 5/531* (2013.01)

(58) Field of Classification Search
  None
  See application file for complete search history.

(56) References Cited

U.S. PATENT DOCUMENTS

| | | | |
|---|---|---|---|
| 5,027,245 A | 6/1991 | Nagata et al. | |
| 6,970,314 B2 | 11/2005 | Watson et al. | |
| 8,243,385 B2 | 8/2012 | Biskeborn et al. | |
| 8,810,960 B2 | 8/2014 | Dee | |
| 9,218,838 B2 | 12/2015 | Biskeborn et al. | |
| 10,032,471 B2* | 7/2018 | Biskeborn | G11B 5/4893 |
| 2014/0327987 A1 | 11/2014 | Biskeborn et al. | |
| 2015/0170691 A1 | 6/2015 | Biskeborn et al. | |
| 2017/0372735 A1 | 12/2017 | Biskeborn | |

OTHER PUBLICATIONS

List of IBM Patents or Patent Applications Treated as Related.
Biskeborn, R., U.S. Appl. No. 15/194,274, filed Jun. 27, 2016.
Non-Final Office Action from U.S. Appl. No. 15/194,274, dated Apr. 20, 2017.
Final Office Action from U.S. Appl. No. 15/194,274, dated Sep. 15, 2017.
Notice of Allowance from U.S. Appl. No. 15/194,274, dated Mar. 16, 2018.

* cited by examiner

*Primary Examiner* — K. Wong
(74) *Attorney, Agent, or Firm* — Zilka-Kotab, P.C.

(57) ABSTRACT

An apparatus according to one embodiment includes a head having at least two modules, each of the modules having an array of transducers and at least one servo transducer. An axis of each array is defined between opposite ends thereof. The axes of the arrays are oriented about parallel to each other. The axes of the arrays are spaced from one another in an intended direction of tape travel thereacross. The array of a first of the modules is offset from the array of a second of the modules in a first direction parallel to the axis of the array of the second module. All of the transducers of the first module are positioned on a first side of an imaginary line oriented in the intended direction of tape travel, wherein all of the transducers of the second module are positioned on a second side of the imaginary line.

18 Claims, 17 Drawing Sheets

MAGNETIC RECORDING HEAD HAVING LONGITUDINALLY SPACED OFFSET ARRAYS

BACKGROUND

The present invention relates to data storage systems, and more particularly, this invention relates to a magnetic head and system implementing the same, where the head includes two offset transducer arrays oriented parallel to each other, longitudinally and opposingly offset from one another so that the two arrays do not overlap the same data tracks when reading and/or writing.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

The quantity of data stored on a magnetic tape may be increased by increasing the number of data tracks across the tape. More tracks are made possible by reducing feature sizes of the readers and writers, such as by using thin-film fabrication techniques and MR sensors. However, for various reasons, the feature sizes of readers and writers cannot be arbitrarily reduced, and so factors such as lateral tape motion transients and tape lateral expansion and contraction (e.g., perpendicular to the intended direction of tape travel) must be balanced with reader/writer sizes that provide acceptable written tracks and readback signals. An issue limiting areal density is misregistration caused by tape lateral expansion and contraction. Tape dimensional instability (TDI) occurs when tape width varies by up to about 0.1% due to expansion and contraction caused by changes in humidity, tape tension, temperature, aging etc. Tilting, pivoting and/or rotating (used interchangeably herein as equivalent terms) of transducer arrays can compensate for misregistration due to TDI and keep the transducers aligned with tracks on the tape.

Inevitably, the desire to increase the rate at which data can be recorded to and read from a tape drive storage system to match the increasing processor rate of computers has led to increasing the number of readers and/or writers a single tape head module to up to, for example, 64 in a single array and all operating concurrently. However, a single array of 64 transducers in the same or smaller span than a previous array design limits the amount of adjustable space between channels in order to address TDI. Furthermore, the cables required per tape span for an array of 64 readers and/or writers may push the limits of flex circuit design and fabrication processing capabilities. Moreover, cables for servicing 64 readers and/or writers presents a significant problem in terms of congestion that may interfere with active track following, and may increase cross talk potential between the write channels or between write and read channels. As the tape capacity increases over generations, managing increasing numbers of reader and/or writer transducers and associated cabling requirements presents significant challenges and is a limiting factor for growing areal density.

BRIEF SUMMARY

An apparatus according to one embodiment includes a head having at least two modules, each of the modules having an array of transducers and at least one servo transducer. An axis of each array is defined between opposite ends thereof. The axes of the arrays are oriented about parallel to each other. The axes of the arrays are spaced from one another in an intended direction of tape travel thereacross. The array of a first of the modules is offset from the array of a second of the modules in a first direction parallel to the axis of the array of the second module. All of the transducers of the first module are positioned on a first side of an imaginary line oriented in the intended direction of tape travel, wherein all of the transducers of the second module are positioned on a second side of the imaginary line.

An apparatus according to another embodiment includes a head having at least three modules, each of the modules having an array of transducers and at least one servo transducer. An axis of each array is defined between opposite ends thereof. The axes of the arrays are oriented about parallel to each other. The axes of the arrays are spaced from one another in an intended direction of tape travel thereacross. The array of a first of the modules is offset from the array of a second of the modules in a first direction parallel to the axis of the array of the second module. The array of the second of the modules is offset from the array of a third of the modules in a first direction parallel to the axis of the array of the third module. All of the transducers of the first module are positioned on a first side of an imaginary line oriented in the intended direction of tape travel, wherein all of the transducers of the second module are positioned on a second side of the imaginary line. All of the transducers of the second module are positioned on a first side of a second imaginary line oriented in the intended direction of tape travel, wherein all of the transducers of the third module are positioned on a second side of the second imaginary line.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1A:
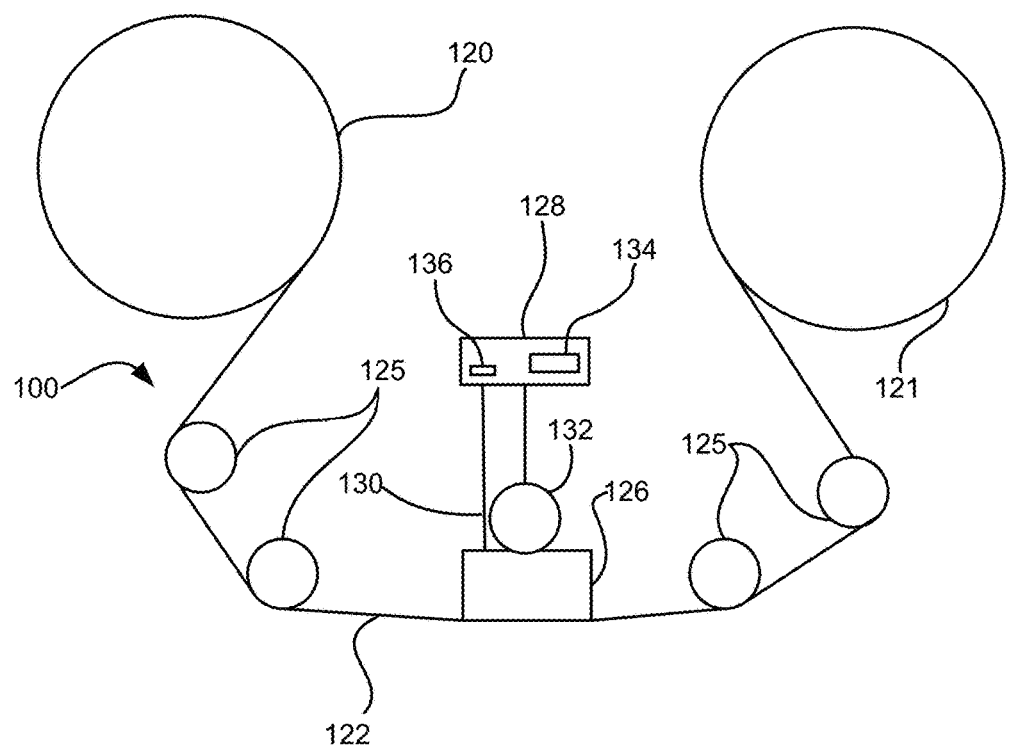
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. In some embodiments, a head includes at least two separate modules, each module having for example half the number of required active transducers in an array. The modules are arranged to enable filling or reading a tape in which data is organized in databands, and may be further arranged to enable compensating for tape dimensional changes.

In one general embodiment, an apparatus includes a head having at least two modules, each of the modules having an array of write transducers. An axis of each array is defined between opposite ends thereof. The axes of the arrays are oriented about parallel to each other. The axes of the arrays are spaced from one another in an intended direction of tape travel thereacross. The array of a first of the modules is offset from the array of a second of the modules in a first direction parallel to the axis of the array of the second module such that the write transducers of the first module and the write transducers of the second module are positioned to fill a contiguous data band with written tracks in multiple passes. All of the write transducers of the first module are positioned on a first side of an imaginary line oriented in the intended direction of tape travel, wherein all of the write transducers of the second module are positioned on a second side of the imaginary line.

In another general embodiment, an apparatus a head having at least two modules, each of the modules having an array of read transducers and at least one servo transducer. An axis of each array is defined between opposite ends thereof. The axes of the arrays are oriented about parallel to each other. The axes of the arrays are spaced from one another in an intended direction of tape travel thereacross. The array of a first of the modules is offset from the array of a second of the modules in a first direction parallel to the axis of the array of the second module such that the read transducers of the first module and the read transducers of the second module are positioned to read a contiguous data band of written tracks in multiple passes. All of the read transducers of the first module are positioned on a first side of an imaginary line oriented in the intended direction of tape travel, wherein all of the read transducers are positioned on a second side of the imaginary line.

In yet another general embodiment, a drive-implemented method includes determining a desired array offset as presented to the tape for arrays of transducers of a head for reading and/or writing to a magnetic tape. Such head may be of a type noted above. The head is rotated to achieve the desired array alignment as presented to the tape.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor (s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
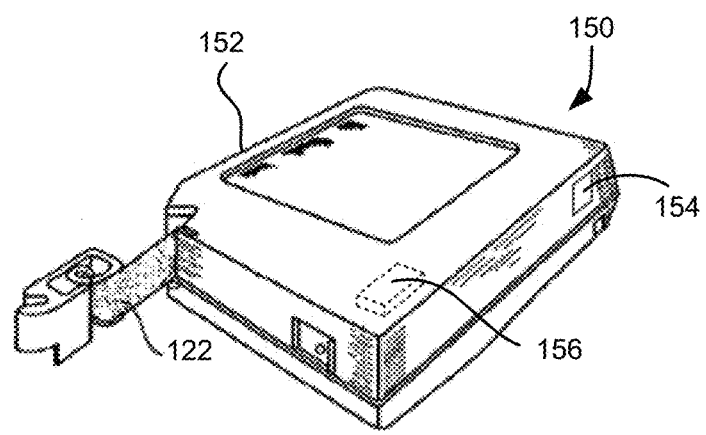
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
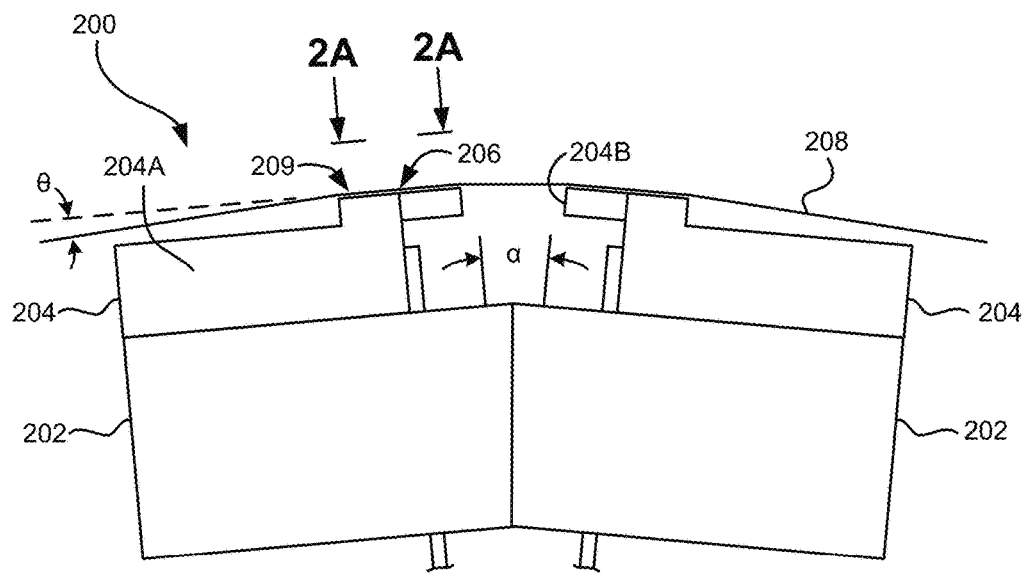
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
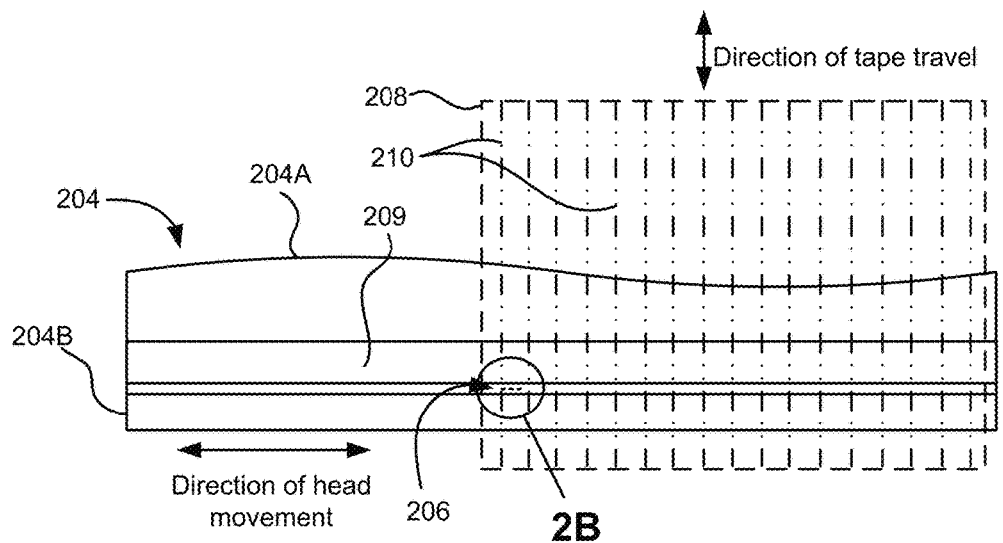
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
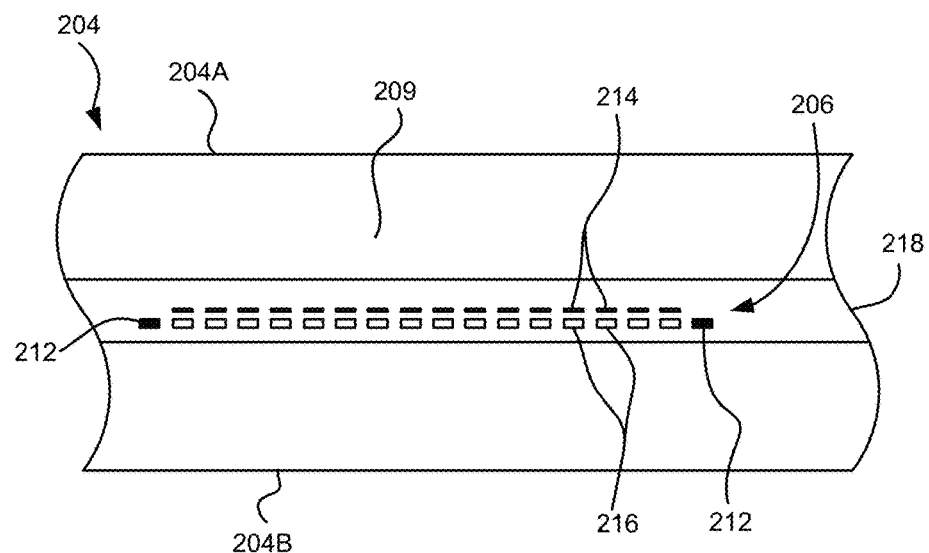
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
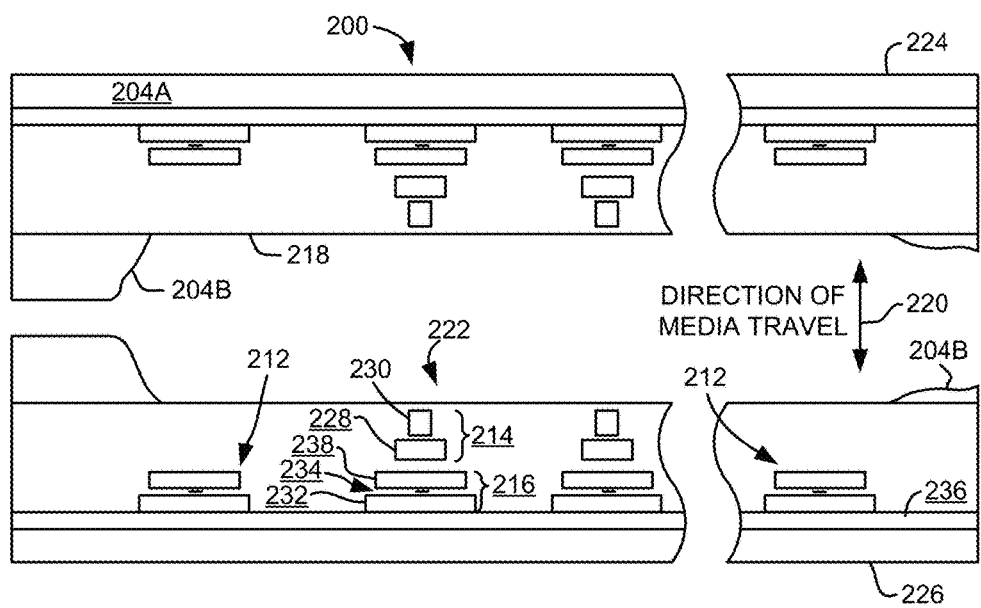
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to an intended direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write while-write capability by activating the writer of the leading module and reader of the trailing module aligned with the writer of the leading module parallel to the intended direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al-Fe-Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
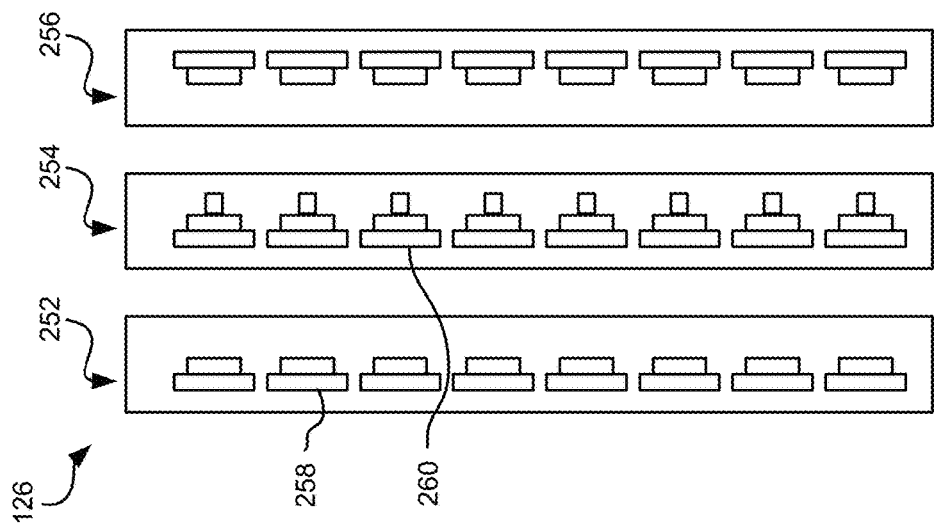
FIG. 4 is a partial tape bearing surface view of a magnetic head having a read-write-read configuration.
Figure 3:
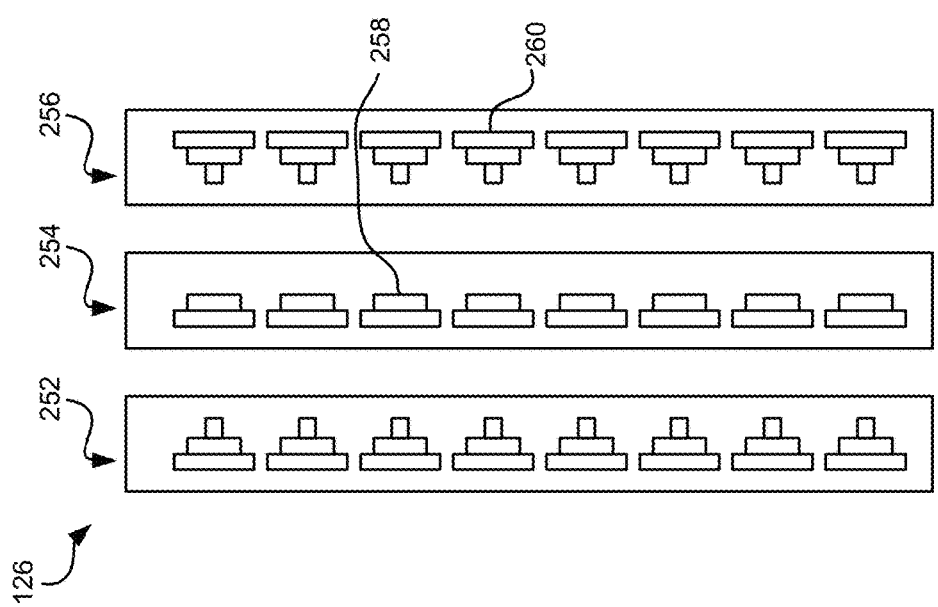
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
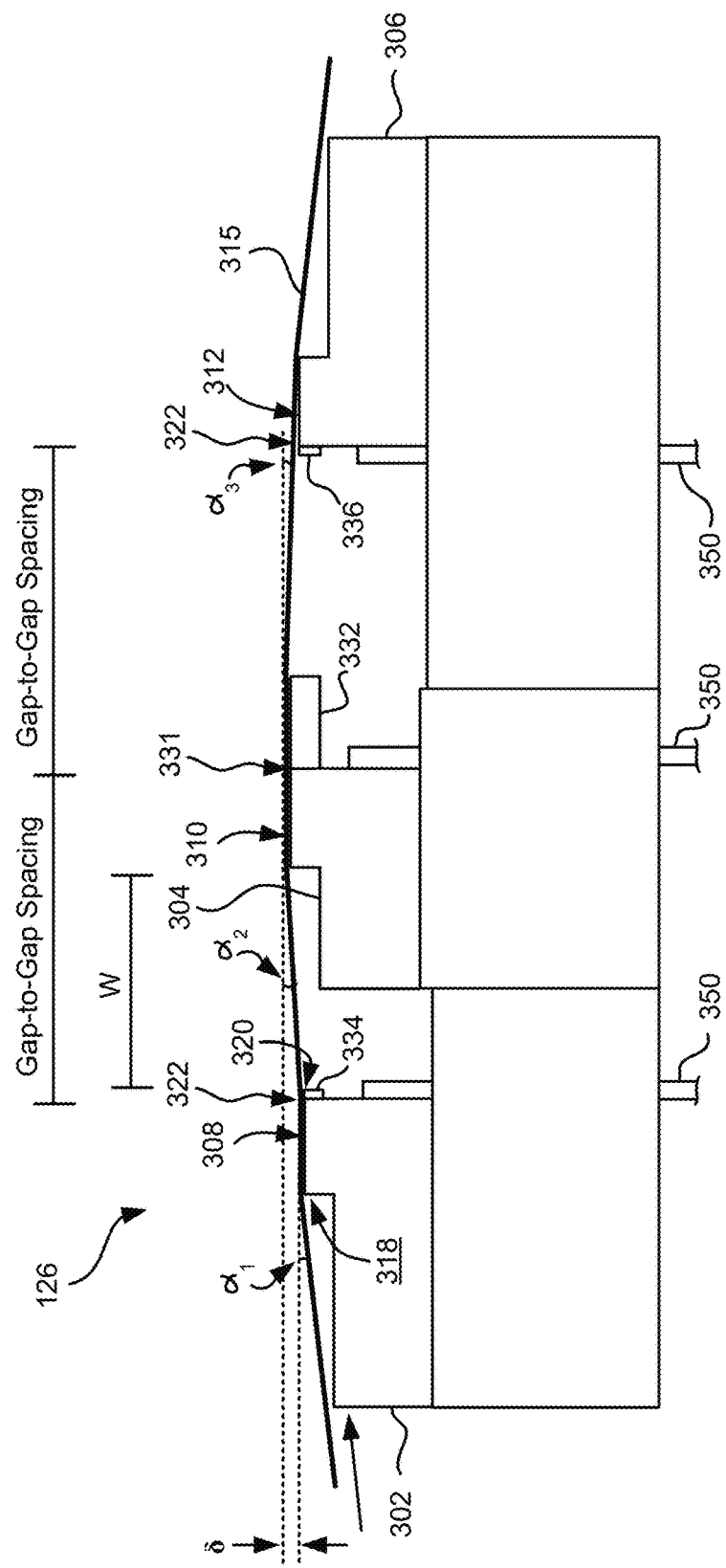
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
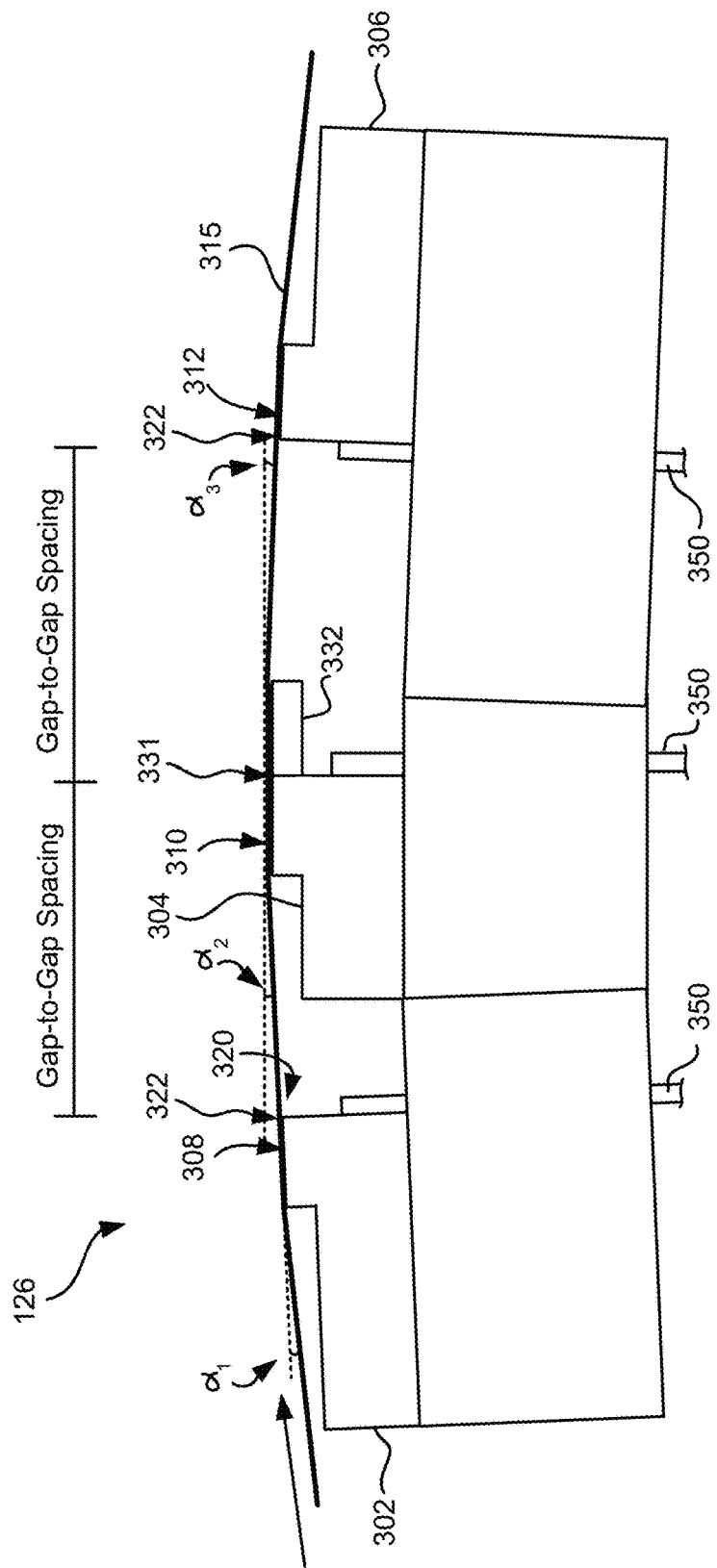
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to an intended direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
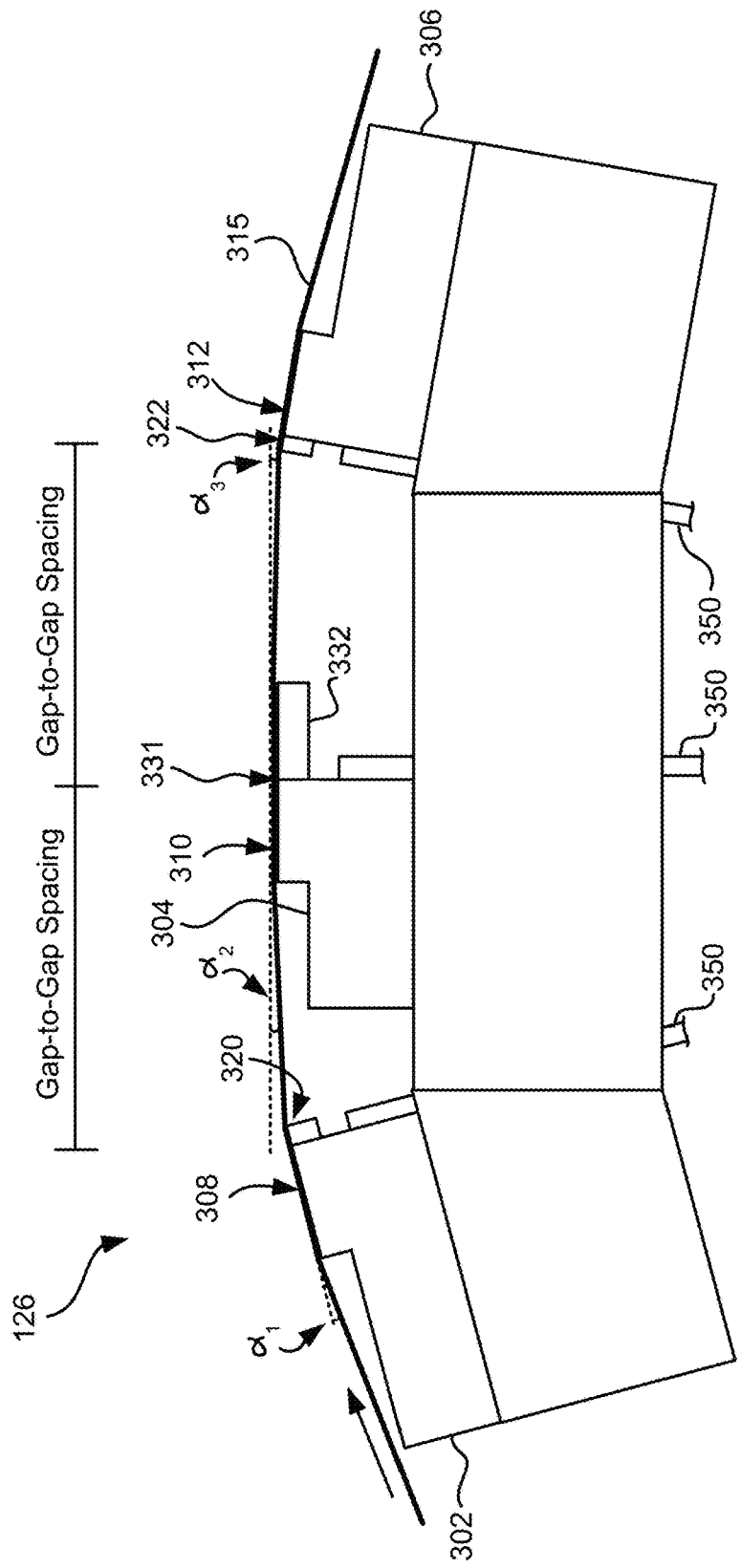
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other embodiments, the modules may be constructed as a unitary body. Those skilled in the art, armed with the present teachings, will appreciate that other known methods of manufacturing such heads may be adapted for use in constructing such heads.

Figure 8A:
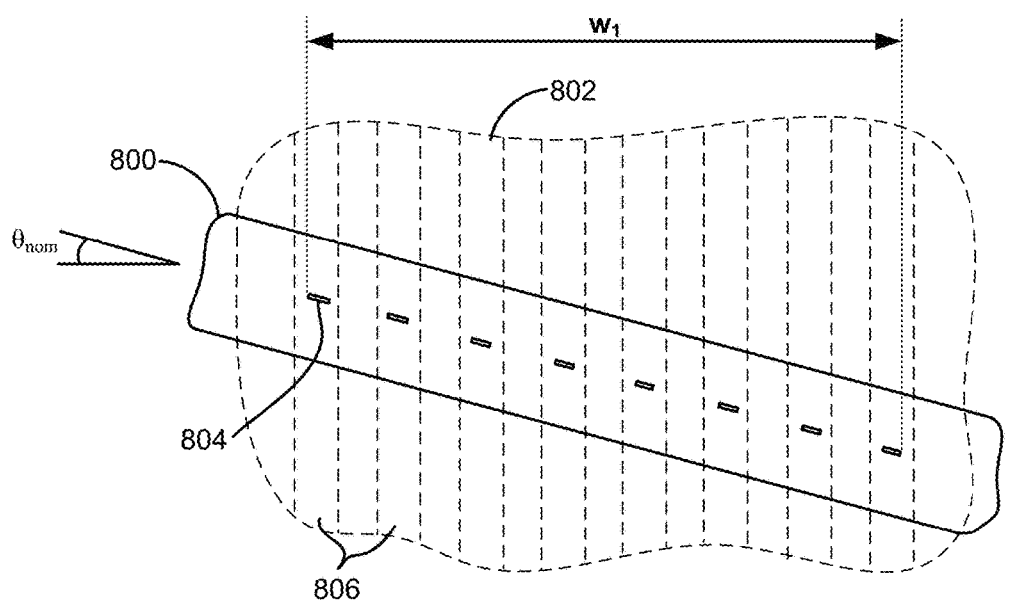
FIGS. 8A-8C are partial top-down representational views of one module of a magnetic tape head according to one embodiment.
Figure 8B:
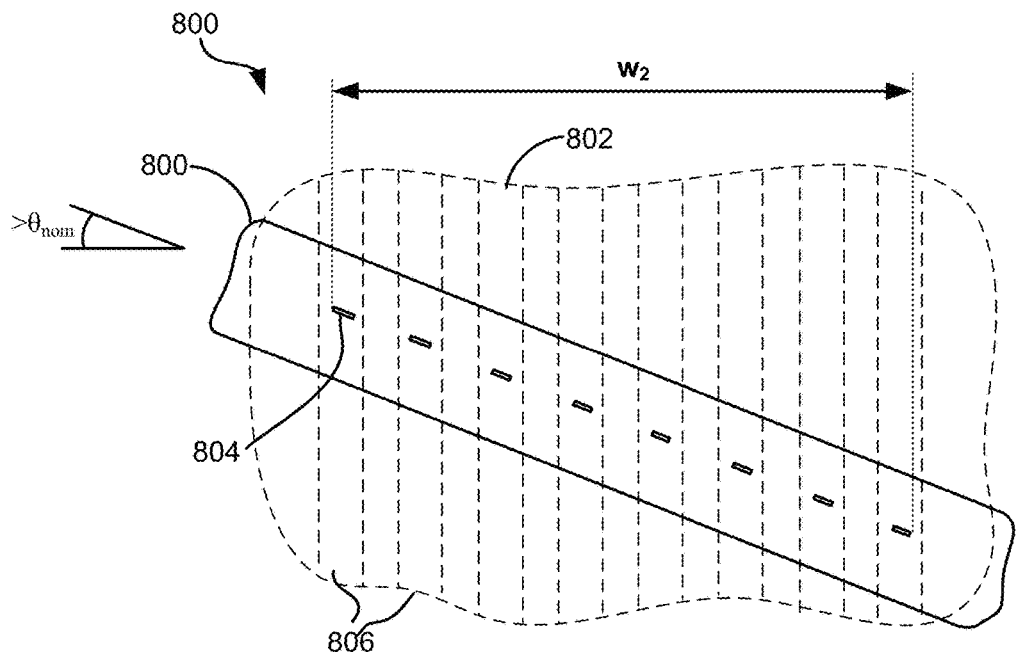
Figure 8C:
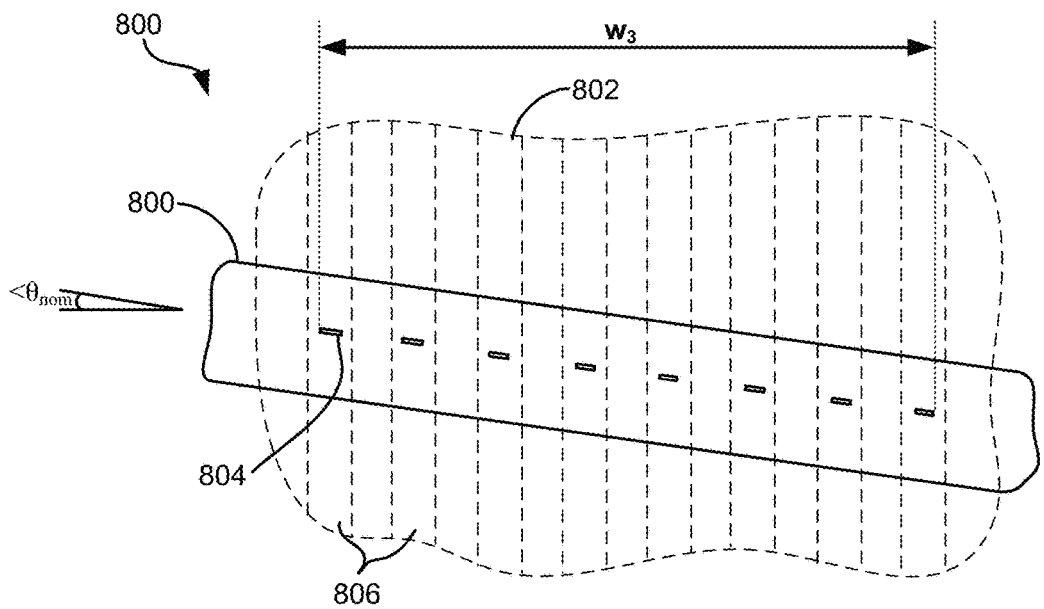

Data track density may be increased by compensating for variation of the tape lateral expansion and contraction using methods of tilting, pivoting and/or rotating (used interchangeably herein, said terms being equivalents) of the transducer arrays to keep the transducers aligned with tracks on the tape. FIGS. 8A-8C illustrate representational views of the effects of orienting a module having transducer arrays. It should be noted that the angles of orientation illustrated in FIGS. 8A-8C are an exaggeration (e.g., larger than would typically be observed), and are in no way intended to limit the invention.

Referring to FIG. 8A, the module 800 is shown relative to the tape 802, where the tape has a nominal width. As illustrated, the module 800 is oriented at an angle $\theta_{nom}$ such that the transducers 804 are favorably aligned with the data tracks 806 on the tape 802. However, when the tape 802 experiences tape lateral contraction and/or expansion, the data tracks 806 on the tape contract and/or expand as well. As a result, the transducers on the module are no longer favorably aligned with the data tracks 806 on the tape 802.

In FIG. 8B, the tape 802 has experienced tape lateral contraction. Therefore, in a manner exemplified by FIG. 8B, the transducers 804 on the module 800 of FIG. 8B would no longer be favorably aligned with the data tracks 806 on the tape 802 if no adjustment were made. Therefore, referring again to FIG. 8B, the angle of orientation $>\theta_{nom}$ of the module 800 is further positioned in order to compensate for tape lateral contraction at an angle greater than $\theta_{nom}$. By increasing the angle $\theta_{nom}$ the effective width $w_2$ of the array of transducers decreases from the effective width $w_1$ illustrated in FIG. 8A. This also translates to a reduction in the effective pitch between the transducers, thereby realigning the transducers along the contracted data tracks 806 on the tape 802 as shown in FIG. 8B.

On the other hand, when the tape experiences tape lateral expansion, the data tracks on the tape expand as well. As a result, the transducers on the module would no longer be favorably aligned with the data tracks on the tape if no adjustments were made. With reference to FIG. 8C, the tape 802 has experienced tape lateral expansion. Therefore, referring again to FIG. 8C, the angle of orientation $<\theta_{nom}$ of the module 800 is reduced to an angle less than $\theta_{nom}$ in order to compensate for the tape lateral expansion. By decreasing the angle of orientation $<\theta_{nom}$ the effective width $W_3$ of the array of transducers 804 increases from the effective width $w_1$ illustrated in FIG. 8A. Moreover, reducing the effective width of the array of transducers 804 also causes the effective pitch between the transducers to be reduced, thereby realigning the transducers along the data tracks 806 on the tape 802.

Currently in computer technology, it desirable to increase the rate at which data can be recorded to and read from a tape drive storage system to match the increasing processor rate of computers. Contemplated approaches to increasing I/O capacity included increasing the number of readers and/or writers a single tape head module to up to, for example, 64 in a single array. However, a single array of 64 transducers may have limited adjustable space between channels in order to address tape dimensional instability. Furthermore, the cables required per tape span for an array of 64 readers and/or writers may push the limits of flex circuit fabrication processing capabilities. Moreover, large, bulky, congested cables can interfere with active track following due to the increased stiffness of larger cables, thereby resulting in possible degradation of bit error rate and signal to noise ratio during read back. Attempts to reduce the size of a cable by moving traces closer together were found to result in crosstalk between write channels, which affected writing, which in turn consequently resulted in further degradation of bit error rate and signal to noise ratio during read back.

Thus, it would be desirable to develop a tape drive system that utilizes a small amount of rotation to maintain alignment of arrays of 64 or more readers and/or writers to compensate for tape dimensional instability while relieving the cable congestion associated with these transducers. In conventional heads, adjusting rotation or tilting the head at a nominal angle of at least 0.2° to 1° or more in order to compensate for tape lateral expansion and/or contraction may result in data timing delays in the tilted array. Moreover, the increased cable congestion serving 64 or more writer transducers of an array that result in cross talk between pairs of writers may not be solved with a tilt or rotation of the head.

Various embodiments described and/or suggested herein overcome the foregoing challenges of conventional products, where the tape drive system includes at least two offset transducer arrays oriented parallel to each other, and longitudinally and oppositely offset from one another so that the two arrays do not overlap the same data tracks when reading and/or writing. The modules may be arranged to enable substantially filling a tape in which data is organized in data bands. Furthermore, the at least two modules may be aligned to enable compensating for tape dimensional changes e.g., by centering each array over its respective portion of the data band rather than performing the conventional substantial tilting to create a pronounced change in transducer pitch as presented to tape. Thus, by so aligning the arrays, potential misregistration between outermost transducers and existing tracks is reduced by approximately two times.

In a preferred embodiment, magnetic tape systems may have two or more separate modules, such that each module may have a portion of the array of required transducers for a given read or write operation such that the transducers of the arrays are positioned to read or write a contiguous data band in multiple passes. For example, for a head with 64 transducers, each module may have 32 transducers in each array, typically in a straight row. The two separate modules may be spaced apart in direction of tape motion and vertically offset generally perpendicular to the direction of tape motion such that the arrays do not overlap the same data tracks when reading and/or writing. As mentioned above, the foregoing conventional challenges may be overcome, e.g., by splitting the number of transducers into smaller arrays on separate modules and offsetting the smaller arrays. In some embodiments, the given modules may be rotated relative to orthogonal to the direction of tape travel thereover, e.g., in a plane parallel to the upper surface of the tape to adjust the alignment of the arrays as presented to the tape.

Providing a system that allows for increased numbers of transducers to operate simultaneously, avoids the problems inherent with larger cables, and optionally may be configured for compensating for tape lateral expansion and/or contraction. Various embodiments enable better signal to noise ratio (SNR), and/or higher capacity per unit area of the media.

FIGS. 9A-D depict an apparatus 900 having two, for example, 32-channel modules in which the two 32 channel arrays together create a 64 channel array that may fit a data band, in accordance with one embodiment. Of course, a larger or smaller number of channels may be present in each array various embodiments. As an option, the present apparatus 900 may be implemented in conjunction with features from any other embodiment listed herein, such as those described with reference to the other FIGS. Of course, however, apparatus 900 and others presented herein may be used in various applications and/or in permutations which may or may not be specifically described in the illustrative embodiments listed herein. Further, the apparatus 900 presented herein may be used in any desired environment.

FIGS. 9A-9E depict various embodiments having transducers 914 in multiple arrays. The transducers in each array may be read transducers, write transducers, or both read and write transducers, e.g., piggyback transducer pairs. To provide a context for the reader, the description of FIGS. 9A-9E will refer to write transducers. This is done by way of example only, and it should be understood that the transducers 914 referred to herein may be read transducers.

Figure 9A:
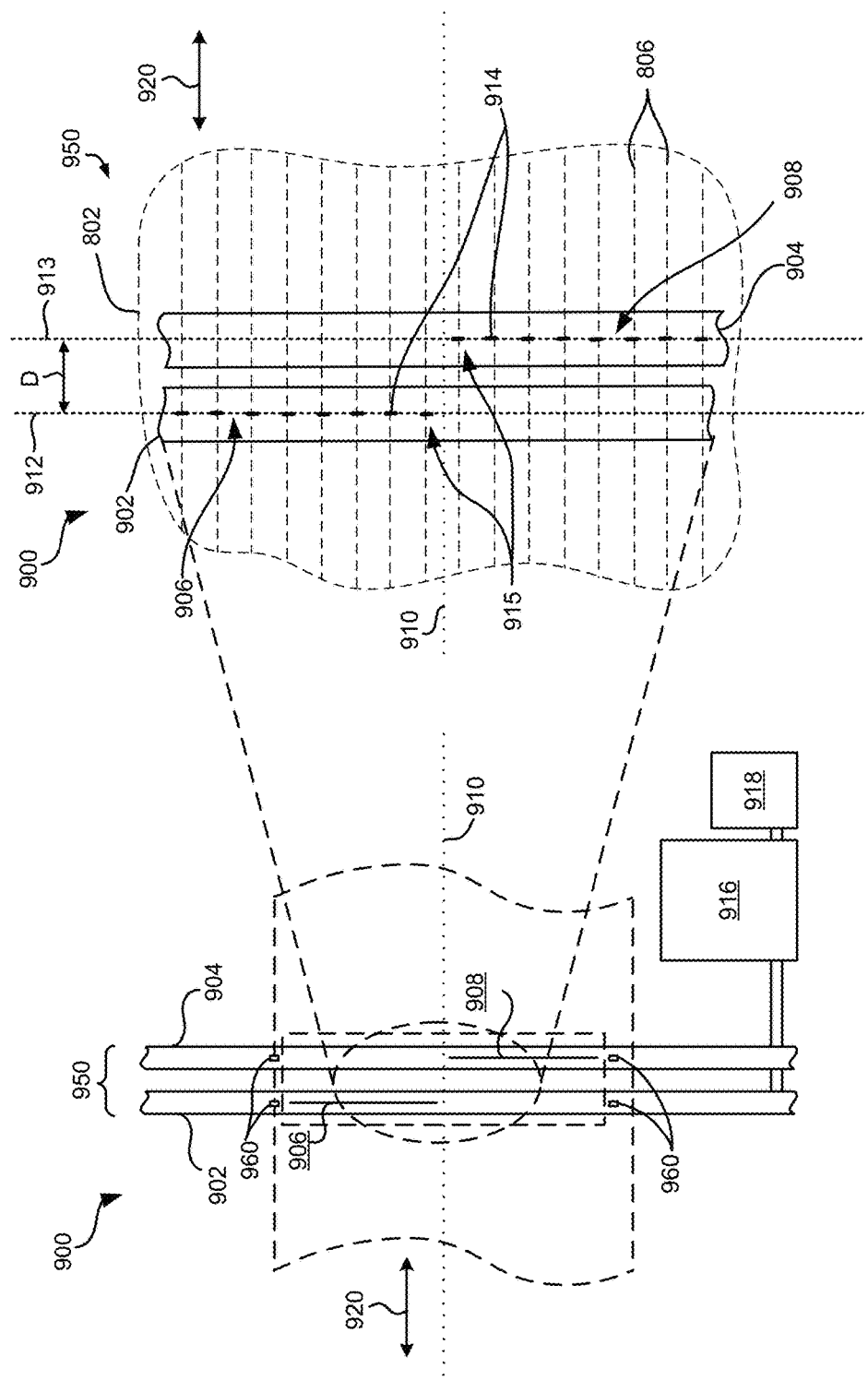
FIGS. 9A-9B are partial top-down representational views of one set of modules of a magnetic tape head according to one embodiment.

Referring to FIG. 9A, the apparatus 900 includes a magnetic head 950 that may have at least two modules 902, 904, each of the modules may have an array 906, 908 of write transducers such that an axis 912, 913 of each array (FIG. 9B) is defined between opposite ends thereof, and the axes 912, 913 of the arrays may be oriented about parallel to each other as well as may be spaced from one another in an intended direction of tape travel 920 thereacross. Furthermore, the array 906 of the write transducers 914 of the module 902 may be offset from the array 908 of write transducers 914 of a second of the modules 904 in a first direction parallel to the axis 913 of the array 908 of a second module 904 such that the write transducers of the first module 902 and the write transducers of the second module 904 may be positioned to fill a contiguous data band 806 with written tracks in multiple passes. In the preferred embodiment, all of the write transducers of the first module 902 may be positioned on a first side of an imaginary line 910 oriented in the intended direction of tape travel 920, where all of the write transducers of the second module 904 may be positioned on a second side of the imaginary line 910 that is opposite the side of the first module 902.

The modules 902, 904 may be nominally arranged such that the arrays are oriented perpendicular to the direction of tape travel 920. See, e.g., the expanded detail of FIG. 9A.

The modules 902, 904 may be identically formed, where one module is merely rotated relative to the other. In this approach, the transducers in each module may be evenly distributed, confined to one side of the imaginary line 910, or primarily located on one side of the imaginary line 910. In further approaches, the transducers in an array may be either symmetrically or asymmetrically positioned on the respective module. Where more transducers are present than will be used, only those transducers to be used may be connected to a cable.

As depicted in FIG. 9A, a mechanism 916 may be employed for orienting the modules 902, 904 to control the offset between the arrays as presented to a tape 802 with the controller 918 being configured to control the mechanism 916 for orienting the modules 902, 904. The orientation of the modules 902, 904 may be adjusted for following tape skew. In some approaches, the controller 918 may be configured to compensate for TDI.

For example, in a preferred embodiment, the angle of the axes 912, 913 of the arrays relative to a line oriented perpendicular to the direction of tape travel 920 may be adjusted to position the center of each respective array over its portion of the data band on tape. The adjustment is slight, and not in the range of the significantly greater tilting, rotating and/or pivoting is used for TDI compensation by changing the transducer pitch presented to tape, which is described in more detail above with respect to FIGS. 8A-8C. The tilting shown in FIGS. 8A-8C is intended to compensate for tape lateral expansion and contraction within an array of transducers of a module. In sharp contrast, various embodiments use slight corrective tilting that adjusts the position of each array separately to move the center of each array as closely as possible to the center of the respective portion of the data band. Because the pitch of the transducers as presented to tape does not significantly change, some misregistration may occur along the outer ends of each array. Nonetheless, the effect of TDS is reduced by a factor of two where two arrays are present. Therefore, the extent of misregistration would be minimal. Where three arrays are present, the misregistration is reduced three-fold.

Moreover, this procedure proceeds counterintuitively by providing more tilt in response to detecting tape lateral expansion, and less tilt in response to detecting tape lateral contraction. For example, the array offset as presented to tape is increased when an expanded tape condition is detected. Rotating the head to increase the array offset actually reduces the transducer pitch presented to tape but by a negligibly small amount. However, centering each array over its portion of the data band on tape may provide improved TDI compensation in spite of the very slight misregistration caused by the smaller transducer pitch as presented to tape. Such misregistration may be compensated for by the channel processing circuitry.

Figure 9B:
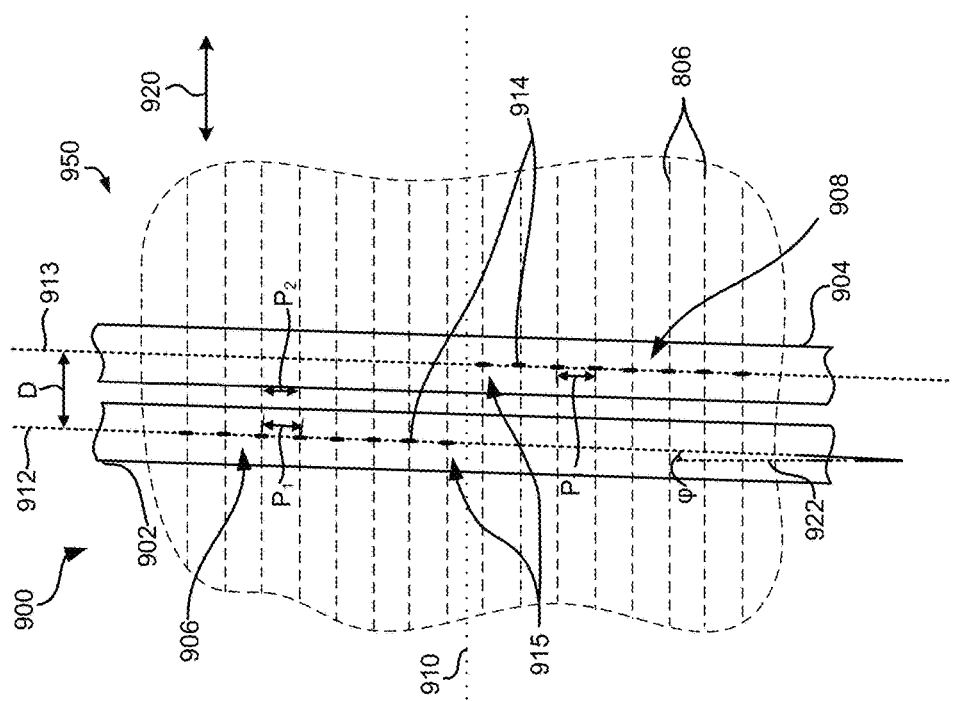

According another embodiment illustrated in FIG. 9B, the write transducers of each array may have a same pitch Pi along the axis of the respective array, where the pitch Pi is the same in both arrays 906, 908. The pitch Pi of the write transducers 914 of both arrays 906, 908 together as presented to the tape 802 may be about the same when the axes 912, 913 of the arrays 906, 908 are oriented at a nominal angle φ, e.g., as fixed in the drive, set using a mechanism and/or controller (see 916, 918 of FIG. 9A) relative to a line 922 orthogonal to the intended direction of tape travel 920.

Figure 9C:
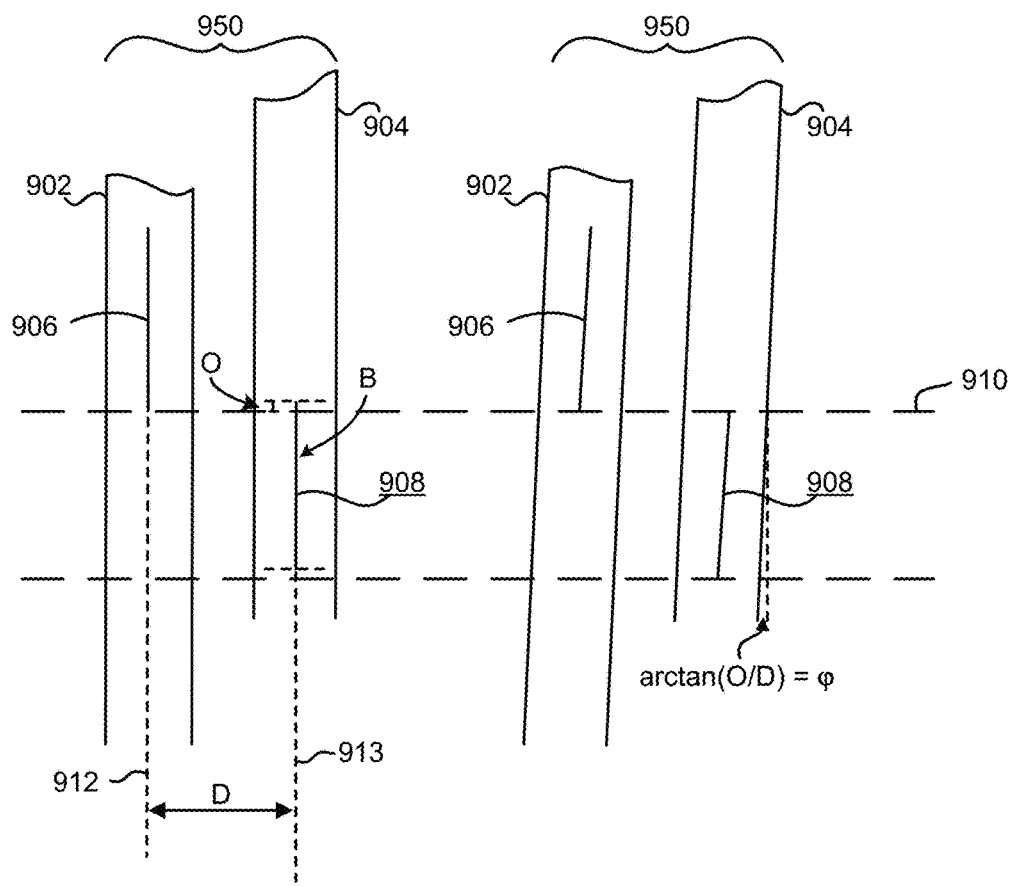
FIG. 9C illustrates calculation parameters usable to determine the tilt to align a set of two separate longitudinally offset modules according to one embodiment.

According to an exemplary embodiment as depicted in FIG. 9C, which is in no way intended to limit the invention, the modules of the tape head 950 may be aligned according to any of the embodiments described herein, e.g. by determining the angle of orientation φ of tilt to align the modules to maintain the alignment of the longitudinally spaced offset modules according to the boundary of the write area of each module. As shown, when the axes of the arrays are orthogonal to the direction of tape motion, a clockwise rotation of the modules increases the offset of the arrays relative to each other in the direction orthogonal to the direction of tape motion, while rotation in the counterclockwise direction reduces the offset.

According to one embodiment, the distance D between the axes 912, 913 of the arrays 906, 908 and the initial overlap O of boundary B of the write areas of the write transducers in the array 908 may be used to calculate the angle of orientation φ of the modules 902 and 904 to align the modules to each other. As illustrated, the angle of orientation with respect to the boundary of the write area of each module and the distance between the arrays of transducers of the modules in a direction parallel to their axes 912, 913, which may be calculated using Equation 1.

$$\tan(\varphi) = O/D \quad \text{Equation 1}$$

Equation 1 can be rewritten into Equation 2.

$$\varphi = \arctan(O/D) \quad \text{Equation 2}$$

Other known methods of calculating and/or assigning the angle of orientation φ, distance D between the arrays of any of the modules, and the initial boundary offset O of the write area of each module may be used in other embodiments.

In other embodiments, the module offset at manufacturing assembly may be greater than a format requires, in which case a rotation toward normal to the direction of tape travel is needed to achieve proper alignment between arrays and tape.

The head modules may preferably be skew actuated to correct for tape skew.

According to a preferred embodiment, and with continued reference to FIG. 9B, the axes 912, 913 of the arrays 906, 908 may be oriented at a nominal angle φ that is greater than 0.01°, relative to a line 922 oriented perpendicular to the intended direction of tape travel 920. However, according to various other embodiments, the angle φ is preferably between about 0.005° and about 0.035°, and ideally between about 0.015° and about 0.025°, but could be higher or lower. The small tilt angle φ for alignment of the offset arrays may not have a significant effect on the pitch between the writer transducers as presented to tape. Thus, the timing differences within an array and between arrays may be easily corrected in code or may be negligible.

With continued reference to FIG. 9B, the distance D between the axes 912, 913 of the arrays 906, 908 in the intended direction of tape travel 920 may be at least about 0.01 mm, preferably at least about 0.25 mm to about 1.0 mm, and in some approaches up to about 1.5 mm.

The angle φ at which the axes 912, 913 of the arrays 906, 908 are oriented may be adjustable, and in some approaches continuously or periodically adjusted, based at least in part on any desirable factor. In one approach as shown in FIG. 9C, the selection of the angular orientation of the axes 912, 913 may be made based on obtaining proper alignment of the arrays 906, 908 relative to each other to acquire the proper offset apparent to tape between the innermost transducer 915 of each array. This adjusting of angle φ should not be confused with the more exaggerated tilting, rotating and/or pivoting for TDI compensation by changing the transducer pitch within an array presented to tape, which is described in more detail above with respect to FIGS. 8A-8C.

In a preferred embodiment, adjusting of angle φ is slight, and not in the range of the more exaggerated tilting, rotating and/or pivoting for TDI compensation by changing the transducer pitch presented to tape, which is described in more detail above with respect to FIGS. 8A-8C. Rather, the following method proceeds counterintuitively by providing more tilt in response to detecting tape lateral expansion, and less tilt in response to detecting tape lateral contraction. For example, the array offset as presented to tape is increased when an expanded tape condition is detected. Rotating the head to increase the array offset actually very slightly reduces the transducer pitch presented to tape. However, centering each array over its portion of the data band on tape gives a two-times reduction in misregistration that would result from TDI.

Figure 10:
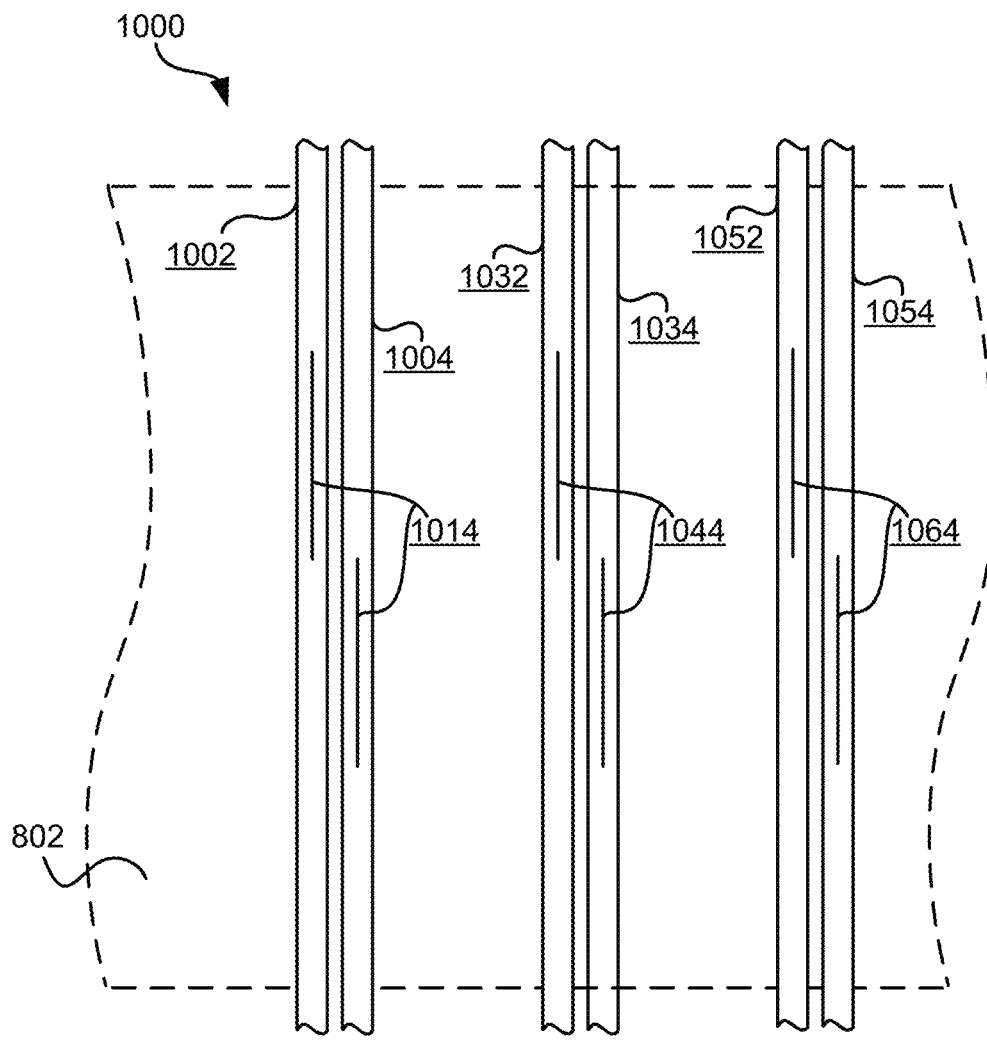
FIG. 10 is a partial top-down representational view of a magnetic head with three sets of modules according to one embodiment.
Figure 11:
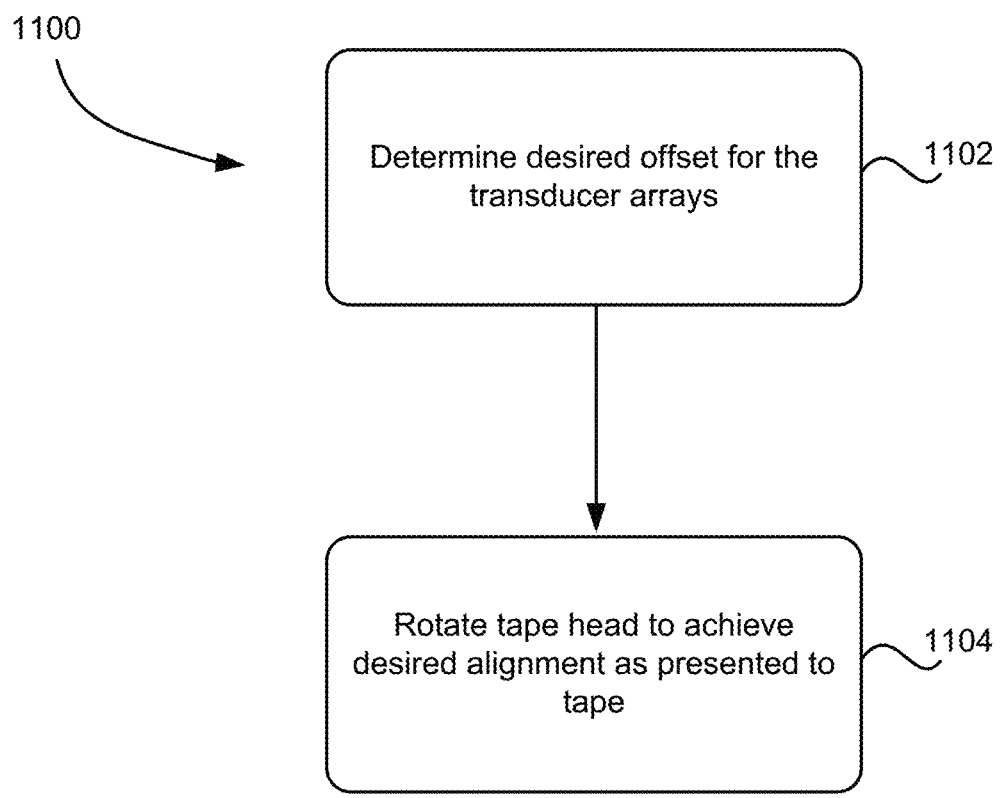
FIG. 11 illustrates a method for determining an array offset to align two separate longitudinally offset modules according to one embodiment.

Now referring to FIG. 11, a flowchart of a method 1100 for introducing a tilt for a head of any type described herein to set a transducer array alignment as presented to tape, is shown according to one embodiment. The method 1100 may be used to create any of the various embodiments depicted in FIGS. 1-10, among others, in various embodiments. Of course, more or less operations than those specifically described in FIG. 11 may be included in method 1100, as would be understood by one of skill in the art upon reading the present descriptions. Each of the steps of the method 1100 may be performed using known techniques according to the teachings herein.

Referring to step 1102 of FIG. 11, the method may include determining a desired offset for the transducer arrays. In one embodiment, the desired offset may be determined based on the state of the tape. An exemplary mechanism for establishing the proper offset is to use the timing interval read by two servo readers to determine the state of the tape, e.g., contracted, expanded or nominal. Although a preferred mode is to use servo data, this is not absolutely required. Thus, it may be desirable to determine the state of the tape, e.g., by incorporating any of the embodiments described and/or suggested herein and/or known processes, when determining the desired offset. However, according to other embodiments, the offset may be determined using any embodiment described and/or suggested herein, or combinations thereof. Note that the transducers in the first and second arrays may be of a same type, e.g., all readers or all writers, in some approaches.

Referring to step 1104 of FIG. 11, the head may be rotated to achieve the desired array alignment as presented to the tape. Note that tape tension may also be used in conjunction with method 1100 to correct for at least some TDI.

In further embodiments, any of the steps of the method described above may be performed concurrently. For example, in one embodiment the proper array offset may be based on data signals. One way to implement this is by first setting the array offset at a nominal value by selecting a nominal angle, and then adjusting the orientation thereof to obtain a better readback quality across the read channels. The quality may be determined for example by finding the lowest error rate, best signal to noise level, etc.

Referring again to FIG. 9B, the transducers 914 of each array 906, 908 may have a same pitch $P_1$ along the axis 912, 913 of the respective array 906, 908, such that the pitch Pi may be the same in both arrays, and the pitch $P_1$ of the transducers 914 of both arrays 906, 908 together as presented to the tape may be about the same when the axes 912, 913 of the arrays 906, 908 are rotated to achieve the desired pitch as presented to the tape.

With continued reference to FIG. 9B, where the head is pivoted to set its angle of orientation, the center of pivot of the head 950 may extend through the module of the first or second array, or some point therebetween, with the head pivoting about an axis approximately orthogonal to the plane of the tape surface using conventional techniques used by individuals skilled in the art. For example, the pivot point may align with an intersection of the center of the first array 906 and the axis 912 of the first array. Moreover, the position of the modules may be adjusted using the actuator as necessary to position the active arrays over the appropriate tracks, e.g., based on servo or other signals.

In other embodiments, linear actuation generally parallel to the axis of the associated array may be used to adjust the offset.

Depending on the embodiment, the center-to-center pitch of all data tracks for a given tape may be specified by the format of the tape, e.g. legacy format, current format. Moreover, according to various embodiments, the format of the tape may specify reading, writing and/or servo following to access data stored in the data tracks of a tape, using a non-tilted head, e.g., having a transducer pitch that about matches the center to center pitch of the data tracks specified in the format. A format may also specify servo frames aligned with each other in a direction perpendicular to the intended direction of tape travel, for a non-tilted head. In one approach, the pitch of the write transducers of the arrays as presented to a tape about matches the pitch of sub data bands specified in the data format the head is designed to comply with.

As an option, the system may continue or periodically monitor the appropriate signals and adjust the orientation. Adjustments can be performed any time, such as during an initialization period prior to reading or writing user data, during readback or writing operations, to compensate for tape skew, etc.

Figure 9D:
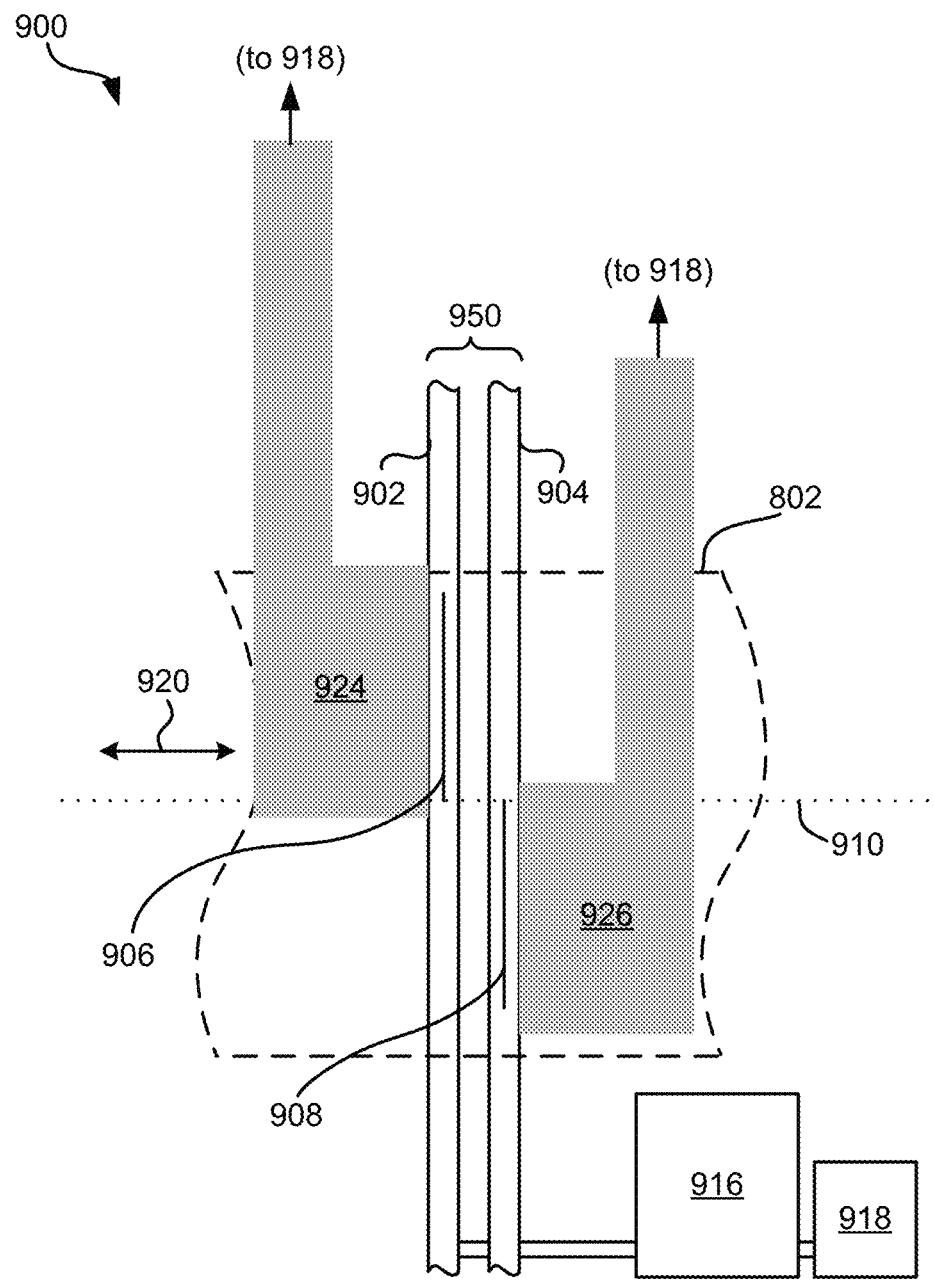
FIG. 9D is a partial top-down representation view of one set of modules of a magnetic tape head according to one embodiment.

As depicted in FIG. 9D, a mechanism 916 may be employed for orienting the modules 902, 904 to control the array offset presented to a tape 802 with the controller 918 being configured to control the mechanism 916 for orienting the modules 902, 904 based on a state of expansion of the tape 802. Furthermore, the controller 918 may also enable writing of transitions that are readable by a non-tilted head compatible with the format. In some embodiments, the system 900 may include a drive mechanism for passing a magnetic medium 802 over the head 950 as well as a controller 918 electrically coupled to the head.

According to some embodiments, the dimensional conditions of the tape when the tape was written may be retrieved e.g., from a database, cartridge memory, etc., and the TDI compensating orientation may be set based thereon to about match the transducer pitch of the current operation to that of the previous operation.

In various embodiments, additional logic, computer code, commands, etc., or combinations thereof, may be used to control the mechanism 916 for adjusting the orientation of the modules based on alignment of the two offset modules to each other and/or skew of the tape. Moreover, any of the embodiments described and/or suggested herein may be combined with various functional methods, depending on the desired embodiment.

As illustrated in FIG. 9D, the separate cables 924, 926 for the write transducers of each separate offset array 906, 908 may minimize crosstalk between cables in the head 950 compared to having all, for example, 64 channels in a single module, and thus requiring a single cable for all 64 channels. For example, an exemplary embodiment demonstrates that 0.3 to 1.0 mm distance D (as depicted in FIG. 9B) between axes 912, 913 of the separate offset modules 902, 904 may provide sufficient space in the cables to minimize writer-to-writer crosstalk in the cables.

Although the magnetic head 950 illustrated in FIGS. 9A-9D includes only two modules 902, 904, according to other embodiments, a system may include more than two modules, e.g., three modules, at least three modules (e.g., see FIG. 10), multiple modules, etc., depending on the desired embodiment.

Figure 9E:
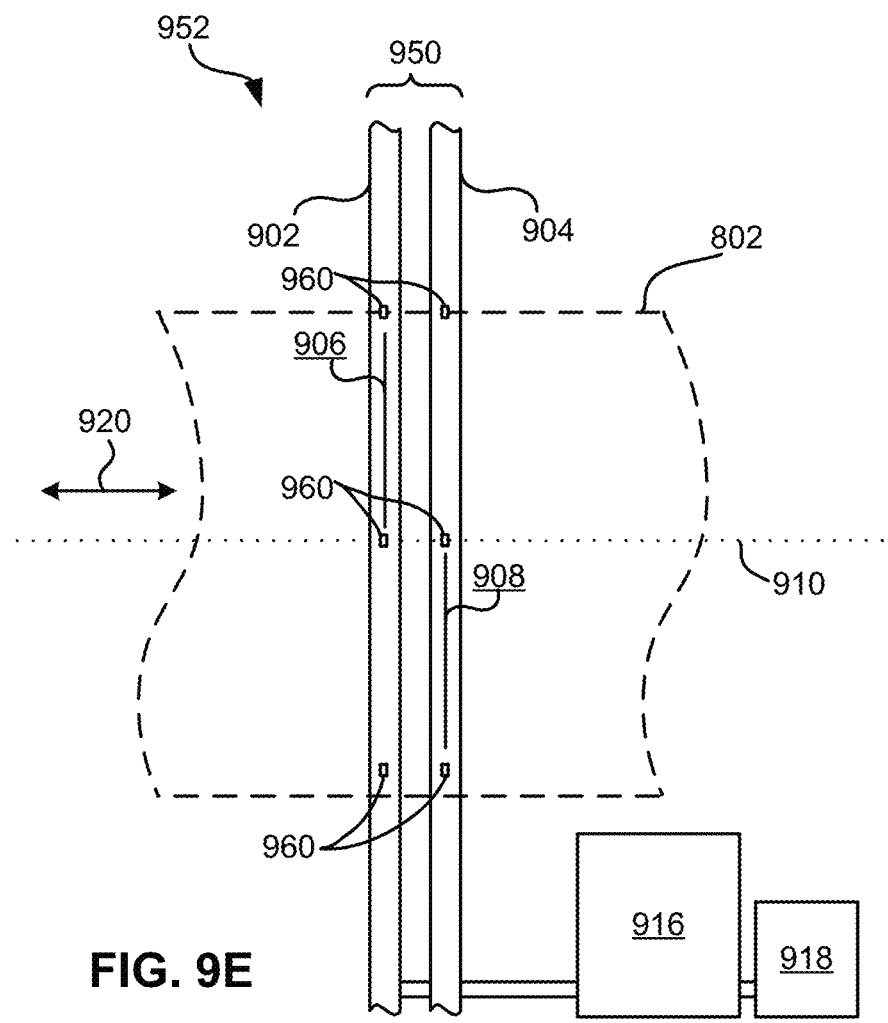
FIG. 9E is a partial top-down representation view of one set of modules of a magnetic tape head according to one embodiment.

Furthermore, according to a preferred embodiment, each module 902, 904 may include at least one servo transducer (e.g., see 212 of FIG. 2C), and possibly two or three servo transducers. For example, FIG. 9A depicts two servo transducers 960 on each module. FIG. 9E depicts an embodiment 952 having three servo transducers 960 on each module.

To assemble any of the embodiments described above, the separate offset modules may be fixed together, e.g. coupled together using conventional u-beam assembly. Those skilled in the art, armed with the present teachings, will appreciate that other known methods of manufacturing such heads may be adapted for use in constructing such heads.

Again, while the foregoing description of FIGS. 9A-9D discuss the transducers in terms of being write transducers, various embodiments may have read transducers instead of write transducers. Such configurations may otherwise be identical, with the exception of the transducer type, and electronics particular to the transducer type, e.g., read channels for read transducers.

An apparatus may include any number of modules e.g., at least two, at least three, at least four, a plurality, etc. depending on the desired embodiment. In an exemplary embodiment which is in no way intended to limit the invention, the outer modules of each set may be configured for writing, and the inner modules may be configured for reading (as shown in FIGS. 5, 6 and 7).

Figure 9F:
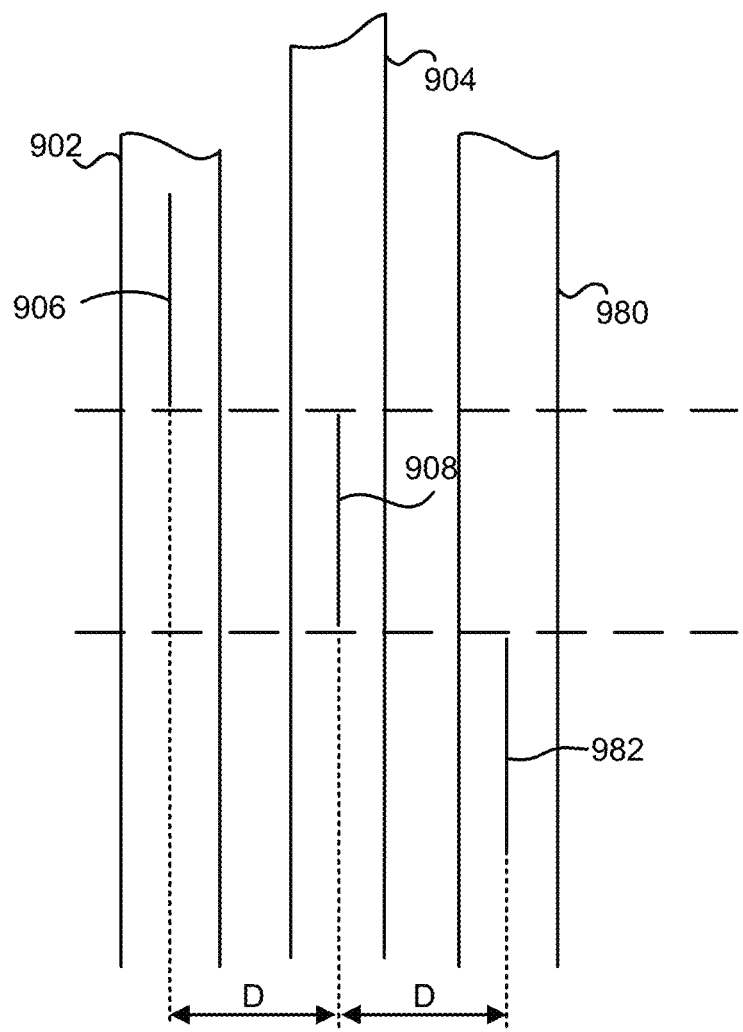
FIG. 9F is a partial top-down representation view of one set of modules of a magnetic tape head according to one embodiment.

FIG. 9F depicts an embodiment having three modules 902, 904, 980, each having an array 906, 908, 982 of transducers that together are arranged to read from and/or write to a contiguous data band in multiple passes. In a 64 channel write configuration, for example, the inner array may have 22 active writers and each outer array may have 21 active writers. Of course, any conceivable arrangement of transducers may be used on the multiple modules, in various embodiments.

In a further approach, the offset transducer arrays may be fabricated on a single module. For example, the distance D between the axes of the arrays could be smaller than in embodiments using two separate modules, and in some approaches, perhaps down to about 50 nm.

FIGS. 10 depicts an apparatus 1000 having a tape head with several sets of longitudinally offset arrays in accordance with one embodiment. As an option, the present apparatus 1000 may be implemented in conjunction with features from any other embodiment listed herein, such as those described with reference to the other FIGS. Of course, however, such an apparatus 1000 and others presented herein may be used in various applications and/or in permutations which may or may not be specifically described in the illustrative embodiments listed herein. Further, the apparatus 1000 presented herein may be used in any desired environment.

As illustrated in FIG. 10, the apparatus 1000 may serve as a write-read-write (WRW) device where the transducers 1014 and 1064 of the outer modules 1002, 1004 and 1052, 1054 may be writers and the transducers 1044 of the inner modules 1032, 1034 may be readers. In one illustrative use case, the writers on the outer module of one set may write while the readers of an inner module of the second set may read back the just-written written track. In another illustrative use case, the writers on the outer module of one set may write while the readers of an inner module of the same set may read back the just-written track.

As alluded to above, in another embodiment, the apparatus 1000 (FIG. 10) may serve as a read-write-read (RWR) device if the first and second modules 1002, 1004 and the fifth and sixth modules 1052, 1054 are designed for at least data reading and optionally not for data writing, while the third and fourth modules 1032, 1034 are designed for at least data writing and optionally not for data reading. However, this is in no way meant to limit the invention; according to various other embodiments, a third, fourth, fifth, etc. module may be positioned with any orientation relative to other modules of the apparatus, depending on the desired embodiment.

In configurations having multiple pairs of modules, any suitable mechanism may be used to ensure that the various pairs remain over the intended portion of the data band during skew compensation, etc. For example, each module pair may be independently acuatable.

It will be clear that the various features of the foregoing systems, apparatuses and/or methodologies may be combined in any way, creating a plurality of combinations from the descriptions presented above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. It will be further appreciated that embodiments of the present invention may be provided in the form of a service deployed on behalf of a customer to offer service on demand.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   a head having at least two modules, each of the modules having an array of transducers and at least one servo transducer,
   wherein an axis of each array is defined between opposite ends thereof,
   wherein the axes of the arrays are oriented about parallel to each other,
   wherein the axes of the arrays are spaced from one another in an intended direction of tape travel thereacross,
   wherein the array of a first of the modules is offset from the array of a second of the modules in a first direction parallel to the axis of the array of the second module, and
   wherein all of the transducers of the first module are positioned on a first side of an imaginary line oriented in the intended direction of tape travel, wherein all of the transducers of the second module are positioned on a second side of the imaginary line.

2. An apparatus as recited in claim 1, wherein the pitch of the transducers of the arrays as presented to a tape about matches the pitch of sub data bands specified in a data format the head is designed to comply with.

3. An apparatus as recited in claim 1, wherein the transducers of each array have a same pitch along the axis of the respective array, wherein the pitch is the same in both arrays, wherein the pitch of the transducers of each array as presented to the tape is about the same when the axes of the arrays are oriented at a nominal angle relative to a line orthogonal to the intended direction of tape travel.

4. An apparatus as recited in claim 3, wherein the nominal angle is between about 0.005 and about 0.035 degrees.

5. An apparatus as recited in claim 1, wherein a distance between the axes of the arrays in the intended direction of tape travel is at least about 0.25 mm.

6. An apparatus as recited in claim 1, comprising a mechanism for orienting the modules to control an offset of the arrays of the transducers as presented to a tape; and a controller configured to control the mechanism for orienting the modules.

7. An apparatus as recited in claim 6, wherein the controller is configured to control the mechanism for orienting the modules to increase a distance of the arrays from the imaginary line when the tape is in a relatively expanded state, wherein the controller is configured to control the mechanism for orienting the modules to decrease a distance of the arrays from the imaginary line when the tape is in a relatively contracted state.

8. An apparatus as recited in claim 1, wherein each module has three servo readers.

9. An apparatus as recited in claim 1, comprising:
   a drive mechanism for passing a magnetic medium over the head; and
   a controller electrically coupled to the head.

10. An apparatus, comprising:
    a head having at least three modules, each of the modules having an array of transducers and at least one servo transducer,
    wherein an axis of each array is defined between opposite ends thereof,
    wherein the axes of the arrays are oriented about parallel to each other,
    wherein the axes of the arrays are spaced from one another in an intended direction of tape travel thereacross,
    wherein the array of a first of the modules is offset from the array of a second of the modules in a first direction parallel to the axis of the array of the second module,
    wherein the array of the second of the modules is offset from the array of a third of the modules in a first direction parallel to the axis of the array of the third module,
    wherein all of the transducers of the first module are positioned on a first side of an imaginary line oriented in the intended direction of tape travel, wherein all of the transducers of the second module are positioned on a second side of the imaginary line, and
    wherein all of the transducers of the second module are positioned on a first side of a second imaginary line oriented in the intended direction of tape travel, wherein all of the transducers of the third module are positioned on a second side of the second imaginary line.

11. An apparatus as recited in claim 10, wherein the pitch of the transducers of the arrays as presented to a tape about matches the pitch of sub data bands specified in a data format the head is designed to comply with.

12. An apparatus as recited in claim 10, wherein the transducers of each array have a same pitch along the axis of the associated array, wherein the pitch is the same in both arrays, wherein the pitch of the transducers in each array of transducers together as presented to the tape is about the same when the axes of the arrays are oriented at a nominal angle relative to a line orthogonal to the intended direction of tape travel.

13. An apparatus as recited in claim 12, wherein the nominal angle is between about 0.005 and about 0.035 degrees.

14. An apparatus as recited in claim 10, wherein a distance between the axes of the arrays in the intended direction of tape travel is at least about 0.25 mm.

15. An apparatus as recited in claim 10, comprising a mechanism for orienting the modules to control an offset of the arrays of the transducers as presented to a tape; and a controller configured to control the mechanism for orienting the modules based on a state of expansion of the tape.

16. An apparatus as recited in claim 15, wherein the controller is configured to control the mechanism for orienting the first and second modules to increase a distance of the arrays of the first and second module from the imaginary line when the tape is in a relatively expanded state,
  wherein the controller is configured to control the mechanism for orienting the second and third modules to increase a distance of the arrays of the second and third module from the second imaginary line when the tape is in a relatively expanded state,
  wherein the controller is configured to control the mechanism for orienting the first and second modules to decrease a distance of the arrays of the first and second modules from the imaginary line when the tape is in a relatively contracted state, and
  wherein the controller is configured to control the mechanism for orienting the second and third modules to decrease a distance of the arrays of the second and third modules from the second imaginary line when the tape is in a relatively contracted state.

17. An apparatus as recited in claim 10, wherein each module has three servo readers.

18. An apparatus as recited in claim 10, comprising:
  a drive mechanism for passing a magnetic medium over the head; and
  a controller electrically coupled to the head.

* * * * *